Nov. 16, 1943.　　　A. H. BUMSTEAD　　　2,334,541
PHOTOGRAPHIC APPARATUS
Filed June 14, 1941　　　4 Sheets-Sheet 1
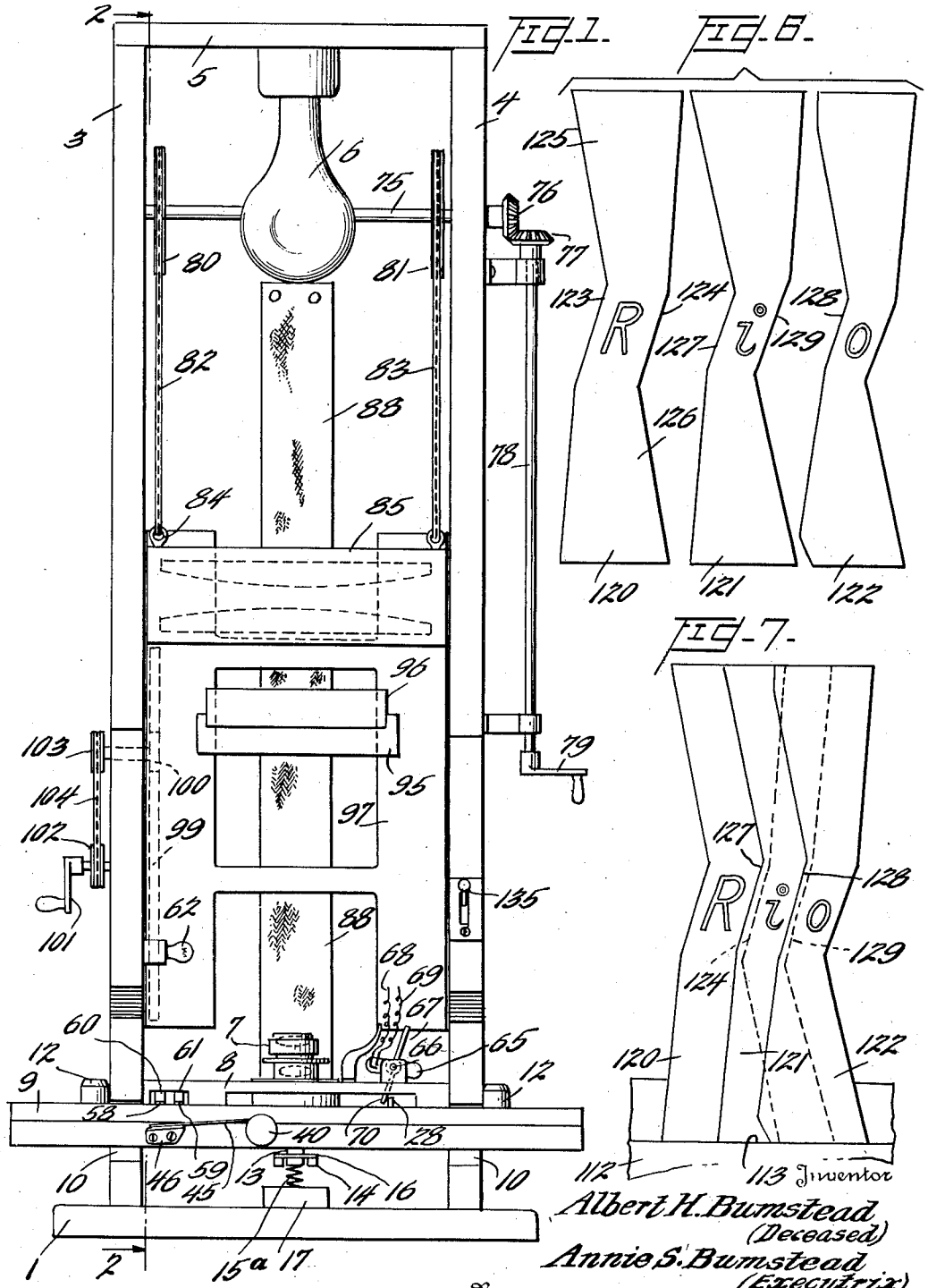
Inventor
Albert H. Bumstead
(Deceased)
Annie S. Bumstead
(Executrix)
By
Attorney Nov. 16, 1943.  A. H. BUMSTEAD  2,334,541
PHOTOGRAPHIC APPARATUS
Filed June 14, 1941  4 Sheets-Sheet 2
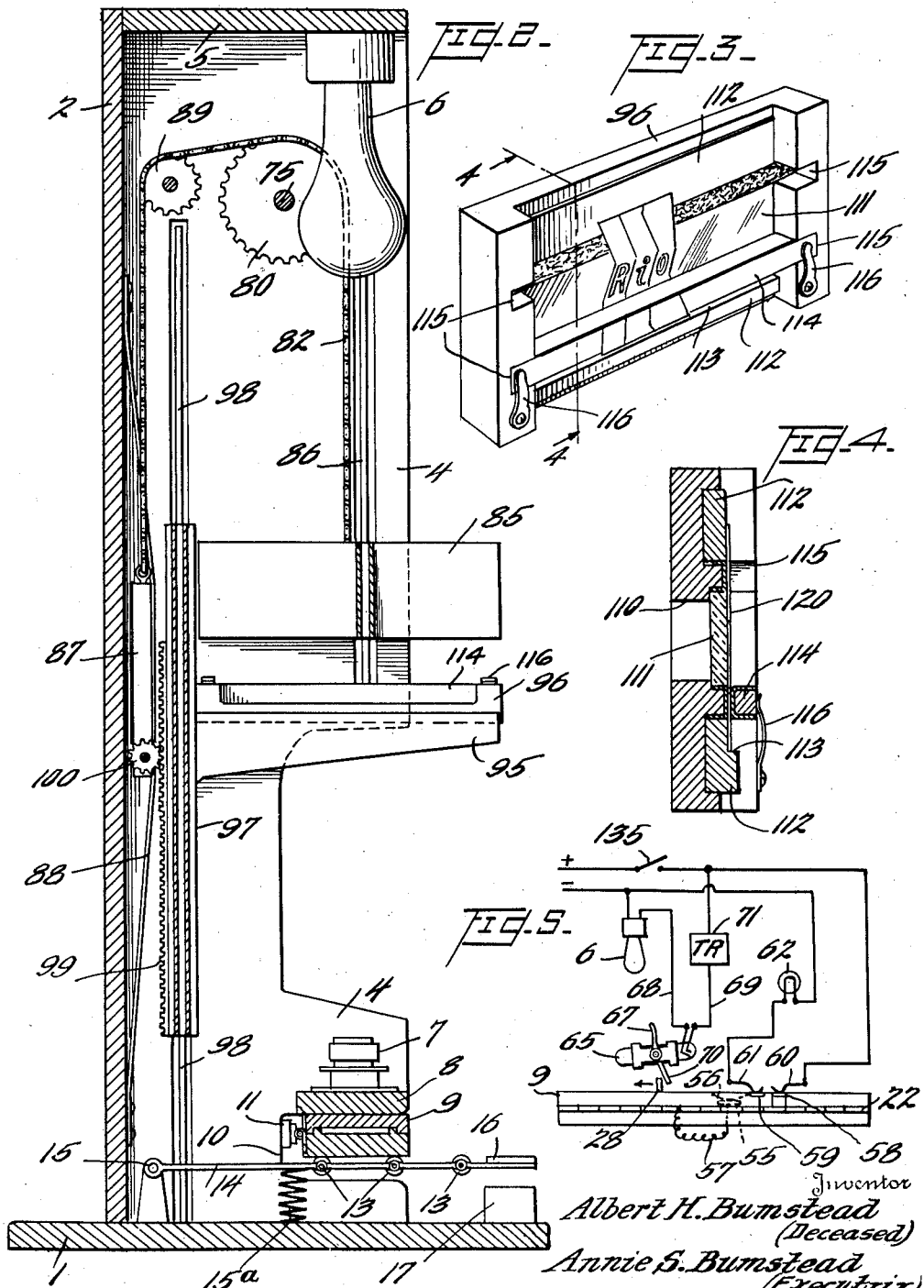

Nov. 16, 1943.     A. H. BUMSTEAD     2,334,541
PHOTOGRAPHIC APPARATUS
Filed June 14, 1941     4 Sheets-Sheet 3
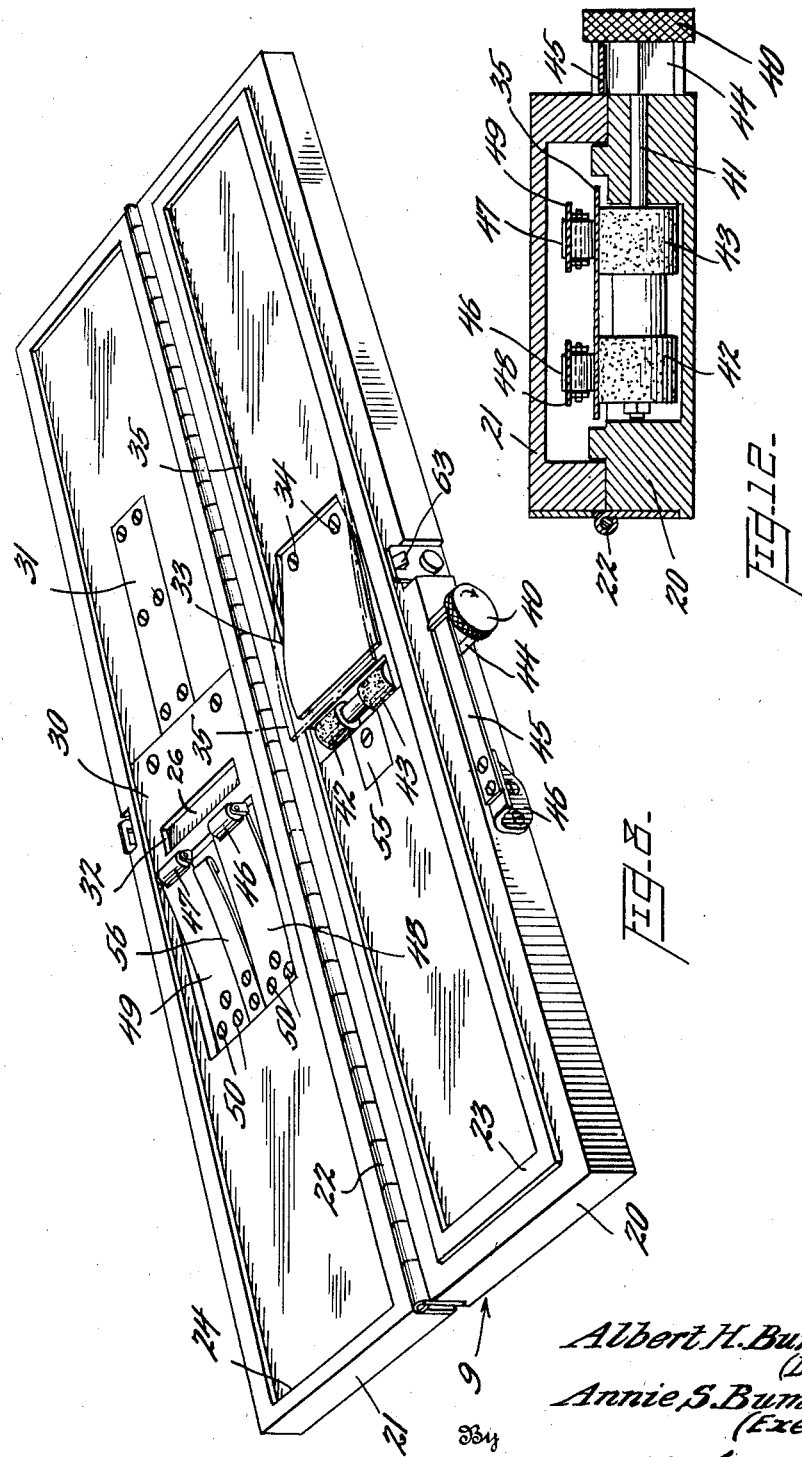
Inventor
Albert H. Bumstead
(Deceased)
Annie S. Bumstead
(Executrix)
By
Attorney Nov. 16, 1943.　　A. H. BUMSTEAD　　2,334,541
PHOTOGRAPHIC APPARATUS
Filed June 14, 1941　　4 Sheets-Sheet 4
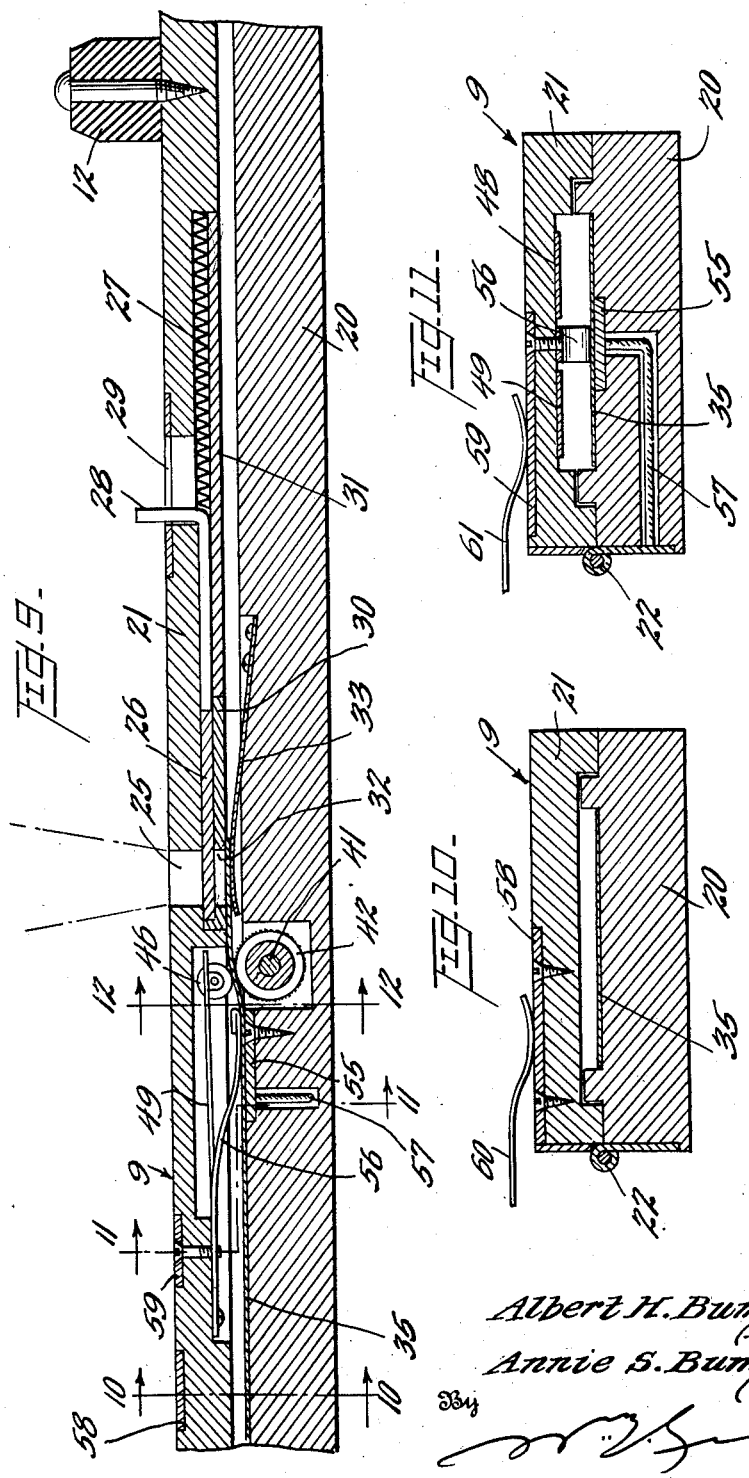
Inventor
Albert H. Bumstead
(Deceased)
Annie S. Bumstead
(Executrix)
By
Attorney Patented Nov. 16, 1943

2,334,541

UNITED STATES PATENT OFFICE 2,334,541

PHOTOGRAPHIC APPARATUS

Albert H. Bumstead, deceased, late of Washington, D. C., by Annie S. Bumstead, executrix, Washington, D. C.

Application June 14, 1941, Serial No. 398,158

6 Claims. (Cl. 88—24)

This invention relates generally to cameras and more particularly to those employed in phototypography, having for its object to provide a construction simple in parts, and more efficient in operation than those heretofore proposed.

With these and other objects in view the invention resides in the novel details of construction and combinations of parts as will be disclosed more fully hereinafter and particularly covered by the claims.

Referring to the accompanying drawings forming a part of this specification and in which like numeral designate like parts in all the views.

Fig. 1 is a front elevational view of a camera made in accordance with this invention;

Fig. 2 is a vertical sectional view taken as on the line 2—2 of Fig. 1 and looking in the direction of the arrows;

Fig. 3 is a perspective view of the copy holder used in this camera;

Fig. 4 is a sectional view taken as on the line 4—4 of Fig. 3 and looking in the direction of the arrows;

Fig. 5 is a wiring diagram of electric circuits that may be used in the operation of this device;

Fig. 6 is a view of a plurality of separated copy units having characters thereon and which are adapted for placement in the copy holder shown in Fig. 3 for reproduction purposes;

Fig. 7 is a view of the copy units shown in Fig. 6 but in closely assembled formation as they may appear in the copy holder at the time of their reproduction;

Fig. 8 is a perspective view, in open position, of the light-tight box used in this camera for holding and feeding a sensitized medium upon which the reproductions of characters are photographically reproduced;

Fig. 9 is a vertical sectional view taken longitudinally of the box shown in Fig. 8; and Figs. 10, 11 and 12 are vertical sectional views taken transversely of said box as on the lines 10—10, 11—11 and 12—12 of Fig. 9 and looking in the direction of the arrows.

This device comprises a bottom wall 1, a rear wall 2 secured to and rising therefrom, opposite side walls 3 and 4 coextensive with the rear wall, and a top wall 5, the front of the device being completely open. Depending from the top wall is a source of light as for example an electric light bulb 6, and in vertical coaxial alignment therewith is a photographic lens assembly generally identified by the numeral 7 which is carried by a cross support 8 secured between the side walls 3 and 4, said cross support being suitably apertured to pass rays of light from the bulb 6 through the lens assembly to and into the light-tight box generally identified by the numeral 9 and disposed immediately below said cross support.

The side walls 3 and 4 are each provided with a cut-out indicated at 10 into which the light-tight box 9 may be inserted and withdrawn, there being provided a stop member 11 on the rear vertical wall of each cut-out to limit the inward extent of said box into said cut-outs whereby to correctly position said box in its transverse direction. To correctly position said box in its longitudinal direction, there are employed lugs or rollers indicated at 12 secured to the top of the box and adapted to relatively closely fit the outer surfaces of the side walls 3 and 4 as will be readily seen from Fig. 1. Thus, the box 9 is correctly positioned in this camera device so that the light rays from the bulb 6 may pass through a shuttered opening in the top of said box to reach the sensitized medium contained therein.

To press said box vertically upwardly against the under surface of the cross support 8, there is provided a plurality of rollers 13 engageable with the underside of said box, said rollers carried by a lever 14 whose innermost end is pivotally mounted as at 15 to a fixed wall of the device, a strong coil spring 15a being disposed beneath said lever to urge the same upwardly and thereby maintain said box against said cross support. The outermost free end of said lever may have a suitable finger piece 16 for depressing the same, a stop block 17 carried by the bottom wall 1 of the device serving to limit the downward extent of said lever.

The light-tight box generally identified by the numeral 9 is best illustrated in Figs. 8 to 12 and comprises a lower portion 20 and an upper portion or lid 21 secured thereto as by a hinge 22 preferably of the piano type, i. e. a hinge which is continuous from end to end of the box. To prevent light entering the box at the joint between the upper and lower portions thereof, one portion may be provided with the rectangular rib 23 adapted to closely fit within a shoulder 24 of the other portion of the box, as will be clearly understood from the drawings.

The upper portion or lid of the box is provided with an aperture 25 through which the light rays may pass, and this aperture is opened and closed to the light rays by a slidable shutter 26, under the urge of the spring 27, and operable by the pin 28 extending vertically above the top of the box through the pin-slot 29, it being understood that this shutter and its operating mechanism is so mounted within the lid of the box that no light can pass through except at the aperture 25. One method of accomplishing this result is the provision of the metal plates 30 and 31 recessed in the under surface of the box lid to be flush with said surface, the plate 30 underlying the shutter 26 and having the aperture 32 therein registrable with the aperture 25 in the lid proper, and the plate 31 underlying the operating pin 28 and the spring 27. Thus, when the pin 28 is moved to the right as seen in Fig. 9, the shutter 26 will be slid in that direction against the pressure of its spring to open the apertures 25 and 32 to the passage of the light rays, and when the pin 28 is moved in the opposite direction, said apertures will be closed by said shutter.

A broad leaf spring 33 is secured as by the screws 34 along one edge thereof within a recessed portion of the upper surface of the lower portion of said box, said spring being under such tension that its opposite unconfined edge will be urged upwardly to press the sheet of sensitized material (indicated by the dot and dash lines at 35) against the under surface of the plate 30 in the region of the aperture 32 therein, whereby the sensitized surface of said medium will be in the plane of said plate when exposed to the light rays. This sensitized medium may be as desired, i. e. paper or film.

The box 9 is made of any suitable length, with the light admitting aperture 25 substantially midway the ends thereof, whereby a strip of the sensitized medium, in a dark room, may be placed in the left hand end of said box as seen in the drawings, with the sensitized surface uppermost after which the box is transferred to this camera device and positioned therein as hereinbefore explained, and then plural exposures are made upon the sensitized surface until the strip of medium 35 has been fed in successive steps, in accordance with the exposures, to the opposite end of the box.

The means for feeding said strip 35 comprises an external knob 40 (see Figs. 8 and 12) rotatable in the direction of the arrow and mounted upon the shaft 41 disposed transversely of the box and extending through, and having a bearing in, the front wall of the lower portion 20 thereof. Mounted upon said shaft within the box is a pair of spaced feed rollers such as 42 and 43, each roller having a roughened surface and of such diameter as to positively engage the undersurface of the strip of sensitized medium. Said shaft carries a detent 44 externally of the box, the indentations of which may be in any number desired and in accordance with the desired spacings of the exposed portions of the sensitized surface of said medium, and said indentations are snappingly engaged by the spring pawl 45 mounted as at 46 on the outer surface of the box. Thus, for each exposure of the sensitized medium, the knob 40 is turned until the pawl 45 engages the next succeeding indentation of the detent 44, as will be readily understood.

Cooperating with the feed rollers 42 and 43, are the pressure rollers 46 and 47, preferably of electrical insulating material, carried at the free ends of the spaced leaf springs 48 and 49 secured as by the screws 50 in a recessed portion of the lid of the box, the pressure rollers 46 and 47 being disposed immediately above the feed rollers when the box is closed and thereby pressing the strip medium 35 to insure its feed upon the turning of the knob 40.

Means are provided for indicating when the strip material 35 has been fed to such a distance that no more exposures should be made thereon, or in other words when said strip is substantially at the limit of its movement into the right hand portion of the box 9. One such means is illustrated in the drawings and comprises a metallic contact plate 55 recessed within the upper surface of the lower portion 20 of the box substantially intermediate the spaced feed rollers 42 and 43, and a metallic spring contact finger 56 recessed at one end in the under surface of the lid of the box and disposed intermediate the leaf springs 48 and 49 carrying the pressure rollers 46 and 47.

The free end of the contact finger 56 is separated from the plate 55 so long as the strip medium 35 is disposed therebetween but, when said strip has been fed by the feed rollers into the right hand end of the box, the end of said strip will ultimately pass from between said contact finger and plate whereupon an electric circuit may be closed by said finger 56 coming in metallic contact with said plate 55.

The contact plate 55 is connected electrically by the wire 57 (see Figs. 9 and 11) to the metallic hinge 22 of the box, and said hinge is electrically connected by a metallic contact plate 58 mounted on the upper exterior surface of the lid 21 of the box. Adjacent said plate 58 is a similar metallic contact plate 59 also mounted on the upper exterior surface of the lid 21 of the box, and this plate 59 is electrically connected to the contact finger 56 disposed on the inner surface of said lid 21. The cross support 3, against the under surface of which the box 9 is pressed, carries two spring contact fingers 60 and 61 adapted to metallically and electrically contact respectively the said plates 58 and 59 when the box 9 is correctly positioned in this camera device (see Figs. 10 and 11), and said fingers 60 and 61 are electrically connected, in series with an audible and/or a visible signal such as a bell and/or the "tell-tale" lamp 62, to a source of electric current as indicated in the electrical diagram illustrated in Fig. 5.

Thus, it will be observed that the contact finger 56 and its companion contact plate 55 are electrically energized when the box 9 is in the camera device, but they will not become effective until the strip medium 35, serving as an insulator, has been fed from therebetween, whereupon the electric circuit will be completed to actuate the "tell-tale" signal (e. g. to cause illumination of the tell-tale lamp 62) which is mounted so as to be readily heard by or visible to the operator of the device. When this tell-tale lamp becomes illuminated, the operator will know that no more exposures should be made on the strip medium 35 within the box, whereupon said box will be removed from the camera device, taken to a dark room and the exposed strip medium removed for photographic development, after which an unexposed strip of sensitized medium will be inserted in the left end of the box, the box closed and secured by the latch 63, and the box reinserted in the camera device, ready for further exposures.

Means are provided for causing illumination of the source of light (bulb 6) when the shutter 26 of box 9 is opened. One such means is illustrated in Figs. 1, 5 and 9 as comprising a well known mercury switch 65 pivotally mounted as at 66 upon the cross support 8 and adapted to be oscillated by the lever 67. The mercury switch 65 is a glass tube having a quantity of mercury sealed therein, and two electrical conductors such as 68 and 69 the ends of which penetrate said tube and are adapted to be placed in electrical connection by the mass of mercury when the tube is tilted to cause said mercury to flow into the end of the tube and cover said ends of the electrical conductors; since this is a well recognized mechanism, it is believed no further description nor any specific illustration thereof is necessary.

The glass tube of the mercury switch is supported in a cradle rigidly mounted upon a rock shaft 66, and the lever 67 is attached to said cradle or to said shaft in such manner that the upper portion of said lever is manipulated by the operator of the camera. Said lever has a depending portion 70 which engages the pin 28 of the shutter 26 in the box 9, wherefore when the lever 67 is oscillated the mercury switch will be made effective to close the electric circuit from a source of energy through the electric bulb 6, and at the same time said lever 67 will actuate the pin 28 to cause the shutter 26 to open and admit the light from bulb 6 through the aperture 25 into the box 9 and onto the sensitized surface of the strip medium 35 in said box.

The spring 27 may be of sufficient strength not only to close the shutter 26 but also to oscillate the lever 67 and thus open the mercury switch 65. If desired, a time relay TR shown at 71 may be connected in the circuit with the lamp 6 and the mercury switch in order to automatically open the electric circuit after a predetermined time of illumination of the bulb 6; in other words different times of exposure may be desired of the sensitized medium in the box 9, and this can be effected manually by the operator, or accomplished mechanically, in the latter instance employing any well known time relay as just stated. A master switch 135 may be provided to control all electric circuits.

Extending transversely across the upper space of the frame of this camera, and having bearings in the side walls 3 and 4 thereof, is a horizontal shaft 75 which upon one outer end has a bevel gear 76 enmeshed with a bevel gear 77 mounted at one end of a substantially vertically disposed shaft 78 mounted in suitable brackets on the outer side of the wall 4, and having at its lowermost end an operating crank 79. Closely adjacent the side walls and mounted upon the shaft 75 is a pair of similar sprockets 80 and 81 engaging the pair of similar chains 82 and 83 respectively, one end of each chain being secured to eyes such as 84 carried at opposite sides of a box 85 in which is mounted a suitable lens for condensing the rays of light from the bulb 6, it being understood that the condensing lens (indicated in dotted lines in Fig. 1) is substantially coaxial with the line joining said bulb and the lens assembly 7 at the bottom of the camera.

This lens box 85 has sliding movement as in the guides 86 carried by the side walls, and the other ends of the chains 82 and 83 are attached to a weight 87 serving as a counterbalance for the lens box, a fabric strap 88 being provided and extending over a face of said weight to prevent the weight from moving forwardly in the framework of the camera to such position as to interfere with the vertical movement of the support for the copy holder presently to be described. By the crank 79 it will thus be understood that the condenser box may be raised and lowered in accordance with the magnification desired in the reproduction to be made upon the sensitized medium, and if necessary idler sprockets indicated at 89 may be provided for the chains 82 and 83 to cause the front and rear portions of said chains to be substantially parallel.

A bracket 95 is provided into which the copy holder, generally identified by the numeral 96, may be slid, said bracket being supported by a vertical frame generally identified by the numeral 97 the side edges of which run in guides such as 98 on the inner surfaces of the side walls 3 and 4, said frame carrying a rack 99 having enmeshed therewith a pinion 100 having bearings in one of the side walls, said pinion actuated as by the crank 101 through suitable and brakeable motion-transmitting devices such as the sprockets 102 and 103 and the chain 104. The frame 97 is preferably adjacent the rear wall 2 of the camera, spaced therefrom sufficiently to permit sliding movement of the condenser box counterweight 87, the bracket 95 extending forwardly and centrally between the side walls so that the copy holder, when positioned as illustrated in the drawings, will have its contained units of reproducible characters in the beams of light from the bulb 6 passing through the condenser box 85 and through the lens assembly 7.

The copy holder 96 is a wooden frame the central portion of which is apertured as at 110 and covered with a transparent glass 111 (see Figs. 3 and 4) so as to pass light therethrough. A removable positioning strip 112 is fitted within a cutaway portion in said frame, said strip having a shoulder 113 upon which are rested the lower end edges of the individual units having characters thereon and illustrated in Figs. 6 and 7. A frictional holding strip 114 has its ends slidably fitted within suitable recesses 115 in the frame sides, spring clips such as 116 being provided for securing the holding strip in place. The surface of the holding strip facing the glass 111 is preferably covered with plush or some other suitable yieldable substance whereby it is possible for the character units to be slipped in place between the plush of the holding strip and the surface of the glass 111 until the ends of said units rest upon the shoulder 113.

If the characters on the units are letters, then the distance between the bottoms of the letters and the bottom edges of the units are made equal so that when said bottom edges are rested against the shoulder 113, all of the letters will be in alignment. The shoulder 113 may be straight or curved depending upon whether the letters of the word are to be in straight or curved formation, as for instance in the formation of geographic names for maps, and this is the reason why the strip 112 is made removable, strips with shoulders of various formations being provided for each copy holder frame.

The copy units are of transparent material, preferably photographic film, the characters on said units being in contrast to the body of the unit, i. e. the body of the unit may be black or opaque with transparent characters, or vice versa, depending upon whether positive or negative reproductions are desired on the strip of sensitized medium 35 in the box 9. In the case of letters constituting the characters on the units, it is preferable to have the sides of a unit adjacent the letter formed parallel with the inclination of the letter, and it has been found highly desirable to have the remaining portion of the body of the unit of widths which are greater than the width of the central portion adjacent the letter.

This is well brought out in Fig. 6 where three units are indicated by the numerals 120, 121 and 122, in separated formation, the unit 120 having the capital letter "R" in its central portion, and the units 121 and 122 having respectively thereon the lower case letters "i" and "o" in order to form ultimately, when brought together, the Spanish word "Rio" meaning "river." The side edges, such as 123 and 124, of each unit adjacent the central lettered portion, are cut to be parallel with the inclination of the letter, but the upper as well as the lower portion of each unit, such as 125 and 126 respectively, have widths which are greater in all portions thereof than the width of the central lettered portion as will be observed. The exact shape of these upper and lower portions of the units may be somewhat varied, but in practically every case they should be of such a shape as to divergently increase in width in the direction toward their upper and lower extremities, as shown.

The reason for this formation of these units, particularly when the units have an opaque background with transparent letters, is to make possible rapid formation of words by bringing plural units together as illustrated in Fig. 7, since no particular care must be exercised in assembling the lettered units except that the cut edges adjacent the letter should at least be brought together to transmit the minimum light through the joint between two adjacent units, and of course this minimum amount of light theoretically is zero.

In other words, in the formation of the word "Rio" in the copy holder, the three units shown in Fig. 6 are selected and slipped under the holding strip 114 until their bottom edges rest upon the shoulder 113 of the positioning strip 112. Then the unit containing the letter "i" can be shifted to the left until its central cut edge 127 abuts and coincides with the central cut edge 124 of the unit containing the letter "R," permitting the upper and lower portions of the two units to overlap. In similar manner the unit containing the letter "o" is moved leftwards until its central cut edge 128 abuts and coincides with the central cut edge 129 of the unit containing the letter "i."

These central cut edges are accurately produced and when so abutted should permit substantially no light to pass through the joint made thereby. If perchance the operator sees some crack or opening between two abutted cut edges, he may cover such crack or opening with a very narrow strip of opaque film slipped under the holding strip 114 in the same manner as the main units bearing the letters. On the other hand, it is possible to slightly overlap the cut edges above referred to, as indicated in Fig. 7 to be sure that no light will pass except through the transparent letters.

It is obvious that those skilled in the art may vary the details of construction and arrangements of parts without departing from the spirit of this invention and therefore it is desired not to be limited to the exact foregoing construction except as may be required by the claims.

What is claimed is:

1. For a camera provided with a source of light at one end thereof, a box attachable to and detachable from the other end of the camera, said box having a hinge connecting two portions thereof together, said box having feeding means therein for moving a strip of sensitized medium from one end of the box to the opposite end thereof, said box having an aperture through a wall thereof and a shutter movable to open and close said aperture to control the rays from the source of light reaching the sensitized medium through said aperture, pressure means within said box for pressing the strip of sensitized medium against the inner box surface adjacent the edges of said aperture, a pair of opposed electrical contact members mounted in said box and normally separated by the strip of sensitized medium disposed therebetween but brought into electric current conducting contact with each other when the said strip has been fed from therebetween, and electrical conductors leading from said pair of contact members and comprising said hinge, said conductors connected in a signal circuit for indicating when the end of the strip of sensitized medium has substantially reached said aperture.

2. For a camera, a box attachable to and detachable from the camera, said box comprising two halves secured together by a hinge, one half having an annular member relatively closely fitting a recessed portion of the other half thereby to render said box light-tight when closed, said box having a wall provided with a light-transmitting aperture therethrough, a shutter mounted within the apertured wall for controlling the light admitted through said aperture, means within said box for feeding a strip of sensitized medium past said aperture, and a pair of opposed electrical contact members mounted in said box and normally separated by the strip of sensitized medium disposed therebetween but brought into electric current conducting contact with each other when the said strip has been fed from therebetween, and electrical conductors leading from said pair of contact members to outside said box for connection in a signal circuit for indicating when the end of the fed strip of sensitized medium has substantially reached said aperture, one of said conductors comprising said hinge.

3. For a camera, a box attachable to and detachable from the camera, said box comprising two halves secured together by a hinge, one half having an annular member relatively closely fitting a recessed portion of the other half thereby to render said box light-tight when closed, said box having a wall provided with a light-transmitting aperture therethrough, a shutter mounted within the apertured wall for controlling the light admitted through said aperture, means within said box for feeding a strip of sensitized medium past said aperture, said feeding means comprising a pair of feed rollers, a roller mounted in each half of the box, one roller under spring tension and disposed to press the strip of sensitized medium against the other roller when the box is closed, and a pair of opposed electrical contact members mounted in said box and normally separated by the strip of sensitized medium disposed therebetween but brought into electric current conducting contact with each other when the said strip has been fed from therebetween, and electrical conductors leading from said pair of contact members to outside said box for connection in a signal circuit for indicating when the end of the said strip of sensitized medium has substantially reached said aperture, one of said conductors comprising said hinge.

4. For a camera, a box attachable to and detachable from the camera, said box comprising two halves secured together by a hinge, one half having an annular member relatively closely fitting a recessed portion of the other half thereby to render said box light-tight when closed, said box having a wall provided with a light-transmitting aperture therethrough, a shutter mounted within the apertured wall for controlling the light admitted through said aperture, means within said box for feeding a strip of sensitized medium past said aperture, and a pair of opposed electrical contact members mounted in said box, a contact member in each half of the box, one contact member under spring tension, both contact members normally separated by the strip of sensitized medium disposed therebetween but brought into electric current conducting contact with each other when the said strip has been fed from therebetween, and electrical conductors leading from said pair of contact members to outside said box for connection in a signal circuit for indicating when the end of the fed strip of sensitized medium has substantially reached said aperture, one of said conductors comprising said hinge.

5. For a camera, a box attachable to and detachable from the camera, said box comprising two halves secured together by a hinge, one half having an annular member relatively closely fitting a recessed portion of the other half thereby to render said box light-tight when closed, said box having a wall provided with a light-transmitting aperture therethrough, a shutter mounted within the apertured wall for controlling the light admitted through said aperture, means within said box for feeding a strip of sensitized medium past said aperture, said feeding means comprising a pair of feed rollers, a roller mounted in each half of the box, one roller under spring tension and disposed to press the strip of sensitized medium against the other roller when the box is closed, and a pair of opposed electrical contact members mounted in said box, a contact member in each half of the box, one contact member under spring tension, both contact members normally separated by the strip of sensitized medium disposed therebetween but brought into electric current conducting contact with each other when the said strip has been fed from therebetween, and electrical conductors leading from said pair of contact members to outside said box for connection in a signal circuit for indicating when the end of the fed strip of sensitized medium has substantially reached said aperture, one of said conductors comprising said hinge.

6. For a camera, a box attachable to and detachable from the camera, said box having two opposed wall surfaces separated from each other a distance only sufficient to permit travel therebetween of a light-sensitive medium, said box having a light-transmitting aperture and a shutter for opening and closing said aperture, said aperture terminating in one of said wall surfaces and said shutter disposed substantially in the plane of that surface, and feeding means for moving the light-sensitive medium between said wall surfaces past said aperture.

ANNIE S. BUMSTEAD,
*Executrix of the Estate of Albert H. Bumstead, Deceased.*